(12) United States Patent
Guthrie et al.

(10) Patent No.: US 7,912,976 B2
(45) Date of Patent: Mar. 22, 2011

(54) METHOD AND SYSTEM FOR THROTTLING NETWORK TRANSMISSIONS USING PER-RECEIVER BANDWIDTH CONTROL AT THE APPLICATION LAYER OF THE TRANSMITTING SERVER

(75) Inventors: Robert Earl Guthrie, Austin, TX (US); Jeffrey Mark Achtermann, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 299 days.

(21) Appl. No.: 12/142,324

(22) Filed: Jun. 19, 2008

(65) Prior Publication Data

US 2008/0244083 A1 Oct. 2, 2008

Related U.S. Application Data

(63) Continuation of application No. 11/014,066, filed on Dec. 16, 2004, now Pat. No. 7,400,578.

(51) Int. Cl.
*G06F 15/16* (2006.01)
*G01R 31/08* (2006.01)
(52) U.S. Cl. .................. 709/232; 709/234; 370/229
(58) Field of Classification Search .................. 709/232, 709/234; 370/229
See application file for complete search history.

(56) References Cited

U.S. PATENT DOCUMENTS

| 6,463,134 | B1 * | 10/2002 | Okada et al. ............... 379/93.24 |
| 6,751,454 | B2 * | 6/2004 | Thornton .................... 455/412.1 |
| 6,813,489 | B1 * | 11/2004 | Wu et al. .................... 455/412.1 |
| 2004/0103193 | A1 | 5/2004 | Pandya et al. |
| 2005/0059382 | A1 * | 3/2005 | Brun et al. ................. 455/412.1 |
| 2005/0152330 | A1 | 7/2005 | Stephens et al. |
| 2007/0025255 | A1 | 2/2007 | Noble |

FOREIGN PATENT DOCUMENTS

CN 178055 4/1998

OTHER PUBLICATIONS

Kamezawa, H.; Nakamura, M.; Tamatsukuri, J.; Aoshima, N.; Inaba, M.; Hiraki, K.;"Inter-Layer Coordination for Parallel TCP Streams on Long Fat Pipe Networks". Supercomputing, 2004. Proceedings of the ACM/IEEE SC2004; 2004 , p. 24-24. [retrieved from IEEE database].*

* cited by examiner

*Primary Examiner* — Joseph Thomas
*Assistant Examiner* — Lashanya R Nash
(74) *Attorney, Agent, or Firm* — Yee & Associates, P.C.; Jeffrey S. LaBaw

(57) ABSTRACT

A method is presented for throttling data transmissions within a data processing system. Information about a data transfer from a server to a client is received within the application layer of a server, which stores the information about the data transfer along with information about a number of recent data transfers from the server to the client to create a sliding window of historical information about data transfers. The data transfer from the application layer of the server is delayed within the application layer of the server for an amount of time that is approximately equal to a computed delay time value in response to a determination that an average data transfer rate over the number of recent data transfers from the server to the client may exceed a data transfer rate threshold parameter.

16 Claims, 7 Drawing Sheets

METHOD AND SYSTEM FOR THROTTLING NETWORK TRANSMISSIONS USING PER-RECEIVER BANDWIDTH CONTROL AT THE APPLICATION LAYER OF THE TRANSMITTING SERVER

This application is a continuation of application Ser. No. 11/014,066, filed Dec. 16, 2004 now U.S. Pat. No. 7,400,578, status allowed.

BACKGROUND OF THE INVENTION

1. Field of the Invention

The present invention relates to an improved data processing system and, in particular, to a method and apparatus for multicomputer data transferring. Still more particularly, the present invention provides a method and apparatus for computer-to-computer data transfer regulating.

2. Description of Related Art

The bandwidth of a network is a resource that needs to be carefully managed. When a number of data transmissions are multiplexed together over a network, the network must efficiently deliver these datastreams and retain the best possible delivered quality even when a transmitting entity attempts to exceed the bandwidth of the intervening network links. Hence, in transferring data within a distributed data processing system between a sending entity, such as a server, and multiple target receiving entities, such as a set of clients, one problem that needs to be addressed is the manner in which data is transmitted from a server to the receivers while managing network bandwidth. More specifically, this problem may include controlling the ability of the server to send an appropriate amount of data to the receivers within an appropriate period of time.

It is often the case that the network bandwidth capacity varies from receiver to receiver. Hence, a simple network management solution that divides network bandwidth equally among the receivers and that transmits data to all receivers at the same rate will result in the bandwidth capacity of one or more receivers being underutilized or overutilized. Although the transmission of data can be managed in a static manner using various threshold limits, the network bandwidth is not utilized efficiently.

Other solutions throttle the transmission of data at the source entity in a dynamic manner by monitoring bandwidth utilization at the OSI transport layer. The Open Systems Interconnection (OSI) Reference Model is a seven-layer abstract description for communications and computer network protocol design which divides the functions of network communication into a stack or a series of layers. The purpose of the transport layer is to provide transparent transfer of data between end users, thus relieving the upper layers from any concern with providing reliable and cost-effective data transfer; TCP/IP (Transport Control Protocol/Internet Protocol) is a commonly used OSI Layer 4 protocol. Although applying bandwidth control at the OSI transport layer can yield efficient bandwidth utilization, these approaches have a significant drawback in that they require replacement of standard TCP/IP software that is commonly bundled within most operating systems. However, it is not an option for many software products to require a significant modification to an operating system with a special TCP/IP implementation that may impact numerous software applications in order to achieve a single software product's goal of efficient bandwidth utilization.

Therefore, it would be advantageous to provide a bandwidth control mechanism within a server that is transmitting data to multiple receivers with different network bandwidth capacities such that the bandwidth control mechanism is wholly contained within a single application.

SUMMARY OF THE INVENTION

A method, an apparatus, a system, and a computer program product are presented for throttling data transmissions within a data processing system. Information about a data transfer from a server to a client is received within the application layer of a server, which stores the information about the data transfer along with information about a number of recent data transfers from the server to the client to create a sliding window of historical information about data transfers. Information about the data transfer may include a byte count for a number of bytes in the data transfer and an approximate transferal time for the data transfer from the application layer of the server. The data transfer from the application layer of the server is delayed within the application layer of the server for an amount of time that is approximately equal to a computed delay time value in response to a determination that an average data transfer rate over the number of recent data transfers from the server to the client may exceed a data transfer rate threshold parameter. The data transfer is released to be performed without delaying the data transfer from the application layer of the server for an amount of time that is approximately equal to a computed delay time value in response to a determination that the average data transfer rate over the number of recent data transfers from the server to the client does not exceed a data transfer rate threshold parameter.

Information about the data transfer may also be stored within the application layer of a server along with information about a number of recent data transfers from the server to a plurality of clients. Even if the data transfer is not delayed for an amount of time that is approximately equal to a computed delay time value in response to a determination that an average data transfer rate over the number of recent data transfers from the server to the client may exceed a data transfer rate threshold parameter, the data transfer from the application layer of the server may be delayed, within the application layer of the server, for an amount of time that is approximately equal to a computed delay time value in response to a determination that an average aggregate data transfer rate over the number of recent data transfers from the server to the plurality of clients may exceed an aggregate data transfer rate threshold parameter.

BRIEF DESCRIPTION OF THE DRAWINGS

The novel features believed characteristic of the invention are set forth in the appended claims. The invention itself, further objectives, and advantages thereof, will be best understood by reference to the following detailed description when read in conjunction with the accompanying drawings, wherein:

DETAILED DESCRIPTION OF THE INVENTION

In general, the devices that may comprise or relate to the present invention include a wide variety of data processing technology. Therefore, as background, a typical organization of hardware and software components within a distributed data processing system is described prior to describing the present invention in more detail.

Figure 1A:
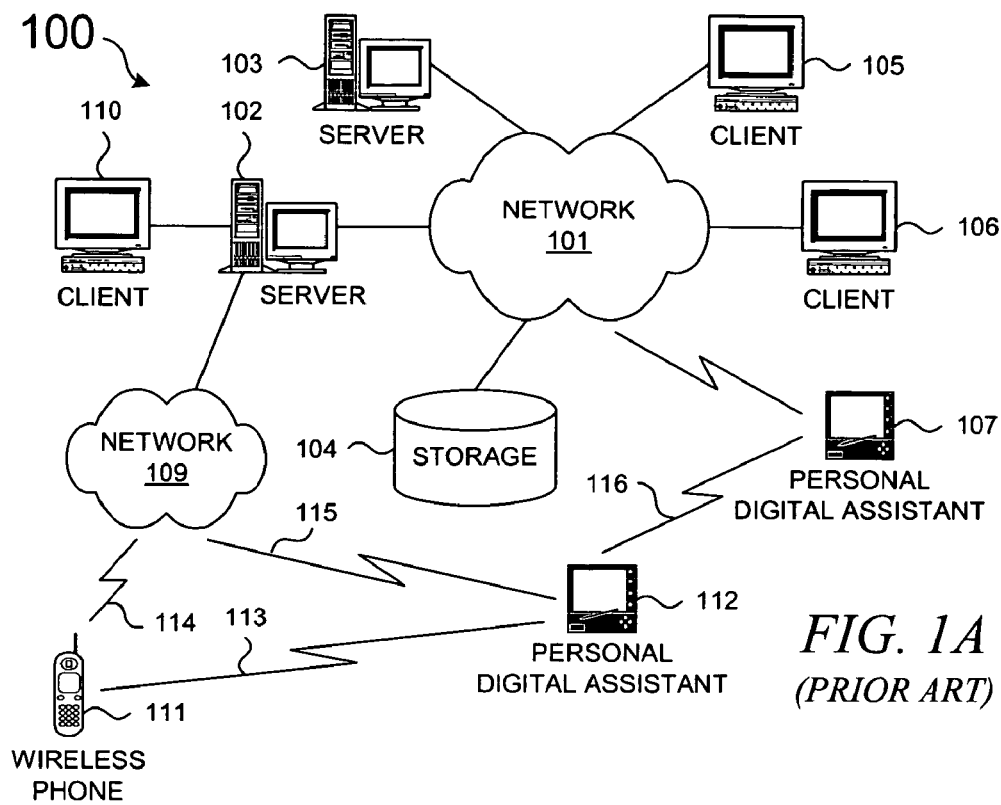
FIG. 1A depicts a typical network of data processing systems, each of which may implement the present invention.

With reference now to the figures, FIG. 1A depicts a typical network of data processing systems, each of which may implement a portion of the present invention. Distributed data processing system 100 contains network 101, which is a medium that may be used to provide communications links between various devices and computers connected together within distributed data processing system 100. Network 101 may include permanent connections, such as wire or fiber optic cables, or temporary connections made through telephone or wireless communications. In the depicted example, server 102 and server 103 are connected to network 101 along with storage unit 104. In addition, clients 105-107 also are connected to network 101. Clients 105-107 and servers 102-103 may be represented by a variety of computing devices, such as mainframes, personal computers, personal digital assistants (PDAs), etc. Distributed data processing system 100 may include additional servers, clients, routers, other devices, and peer-to-peer architectures that are not shown.

In the depicted example, distributed data processing system 100 may include the Internet with network 101 representing a worldwide collection of networks and gateways that use various protocols to communicate with one another, such as Lightweight Directory Access Protocol (LDAP), Transport Control Protocol/Internet Protocol (TCP/IP), Hypertext Transport Protocol (HTTP), Wireless Application Protocol (WAP), etc. Of course, distributed data processing system 100 may also include a number of different types of networks, such as, for example, an intranet, a local area network (LAN), or a wide area network (WAN). For example, server 102 directly supports network 109 and client 110; network 109 incorporates wireless communication links. Network-enabled phone 111 and PDA 112 can directly transfer data between themselves across wireless link 113 using an appropriate technology, e.g., via Bluetooth™ wireless technology or Wi-Fi technology (IEEE 802.11) that allows the creation of so-called personal area networks (PAN) or personal ad-hoc networks. Phone 111 connects to network 109 through wireless link 114, and PDA 113 connects to network 109 through wireless link 115. In a similar manner, PDA 113 can transfer data to PDA 107 via wireless link 116.

The present invention could be implemented on a variety of hardware platforms; FIG. 1A is intended as an example of a heterogeneous computing environment and not as an architectural limitation for the present invention.

Figure 1B:
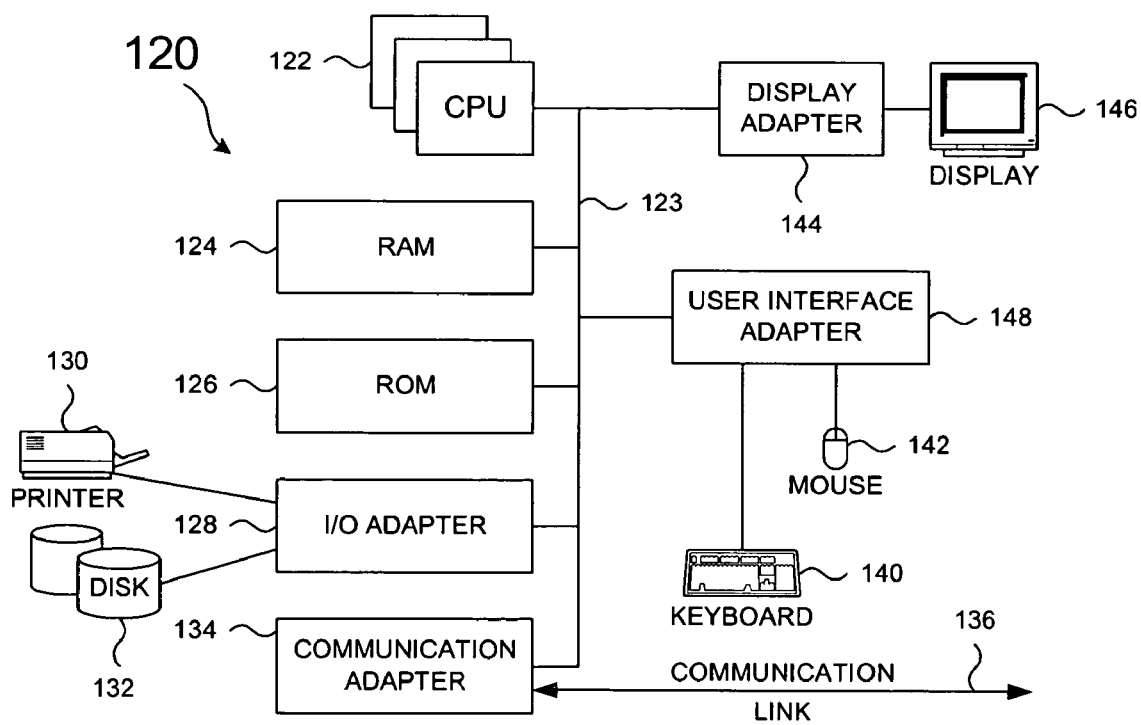
FIG. 1B depicts a typical computer architecture that may be used within a data processing system in which the present invention may be implemented.

With reference now to FIG. 1B, a diagram depicts a typical computer architecture of a data processing system, such as those shown in FIG. 1A, in which the present invention may be implemented. Data processing system 120 contains one or more central processing units (CPUs) 122 connected to internal system bus 123, which interconnects random access memory (RAM) 124, read-only memory 126, and input/output adapter 128, which supports various I/O devices, such as printer 130, disk units 132, or other devices not shown, such as an audio output system, etc. System bus 123 also connects communication adapter 134 that provides access to communication link 136. User interface adapter 148 connects various user devices, such as keyboard 140 and mouse 142, or other devices not shown, such as a touch screen, stylus, microphone, etc. Display adapter 144 connects system bus 123 to display device 146.

Those of ordinary skill in the art will appreciate that the hardware in FIG. 1B may vary depending on the system implementation. For example, the system may have one or more processors, such as an Intel® Pentium®-based processor and a digital signal processor (DSP), and one or more types of volatile and non-volatile memory. Other peripheral devices may be used in addition to or in place of the hardware depicted in FIG. 1B. The depicted examples are not meant to imply architectural limitations with respect to the present invention.

In addition to being able to be implemented on a variety of hardware platforms, the present invention may be implemented in a variety of software environments. A typical operating system may be used to control program execution within each data processing system. For example, one device may run a Unix® operating system, while another device contains a simple Java® runtime environment. A representative computer platform may include a browser, which is a well known software application for accessing hypertext documents in a variety of formats, such as graphic files, word processing files, Extensible Markup Language (XML), Hypertext Markup Language (HTML), Handheld Device Markup Language (HDML), Wireless Markup Language (WML), and various other formats and types of files.

The present invention may be implemented on a variety of hardware and software platforms, as described above with respect to FIG. 1A and FIG. 1B. More specifically, though, the present invention is directed to an improved data processing environment for throttling the frequency of unicast transmissions from a central server or a first system, device, or apparatus, e.g., such as server 103 that is shown in FIG. 1A, to a plurality of receivers or a set of systems, devices, or apparatuses, e.g., such as clients 105-107 and clients 110-112, without overloading or underutilizing the network bandwidth capacity of any individual receiver nor the aggregate network bandwidth capacity of the central server even though the network bandwidth capacity of the individual receivers may vary. Various embodiments of the present invention are explained in more detail hereinbelow with respect to the remaining figures.

Figure 2:
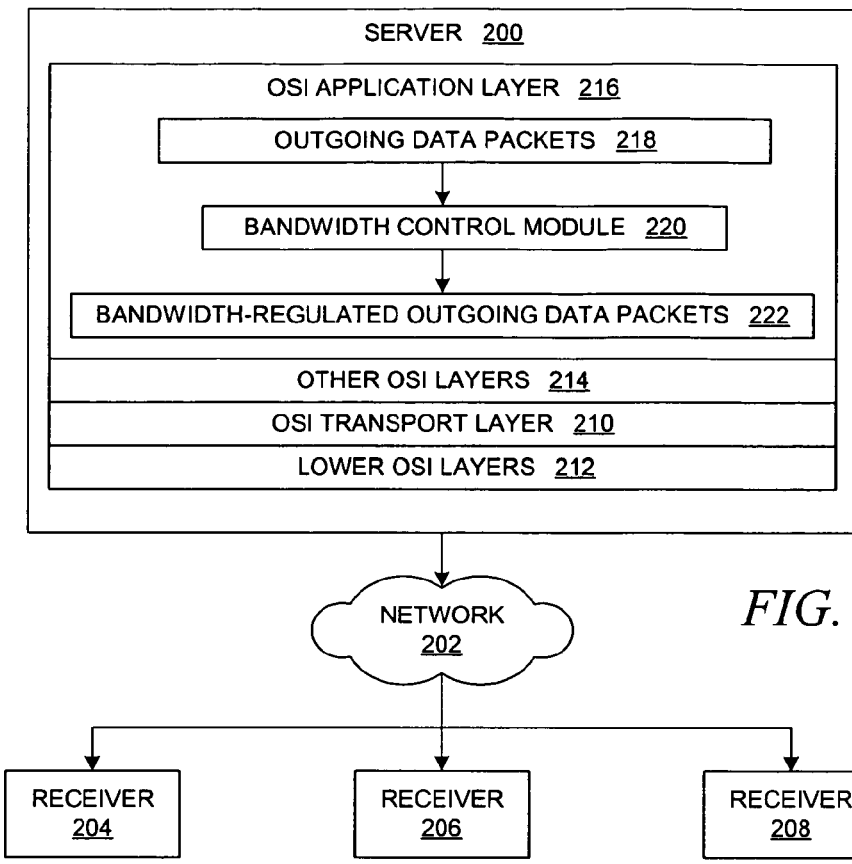
FIG. 2 illustrates a block diagram that shows a central server supporting the transmission of data packets to multiple receivers within a data processing system using bandwidth control that is contained within the application layer of the central server in accordance with the present invention.

With reference now to FIG. 2, a block diagram depicts a central server supporting the transmission of data packets to multiple receivers within a data processing system using bandwidth control that is contained within the application layer of the central server in accordance with the present invention. Server 200 sends data packets via network 202 to data receivers 204-208, which represent various types of client devices, such as those shown in FIG. 1A.

FIG. 2 illustrates that the present invention operates within the Open Systems Interconnection (OSI) network communication model. The OSI Reference Model is a layered abstract description for communications and computer network protocol design which divides the functions of network communication into a series of layers. Each layer has the property that it only uses the functions of the layer below and only exports functionality to the layer above. A system that implements protocol behavior consisting of a series of these layers is known as a protocol stack. This OSI model is widely implemented within the computing, networking, and communication industries; its main feature is in the junction between layers as dictated by specifications on how one layer interacts with another such that a layer written by one manufacturer can interoperate with a layer from another. This logical separation of layers makes reasoning about the behavior of protocol stacks much easier, allowing the design of elaborate but highly reliable protocol stacks. Each layer performs services for the next higher layer, and makes requests of the next lower layer. An implementation of several OSI layers is often referred to as a stack, e.g., TCP/IP stack.

Transport layer 210 is supported by lower OSI layers 212 and supports other OSI layers 214. The transport layer (Layer 4) provides transparent transfer of data between end-users, thus relieving the upper layers from any concern with providing reliable and cost-effective data transfer. Routing and forwarding are functions of this layer, as well as addressing, internetworking, error handling, congestion control, and packet sequencing.

Application layer 216 (Layer 7) is the highest layer, which interfaces directly to and performs common application services for the application processes. The common application services provide semantic conversion between associated application processes. Examples of common application services include virtual file, virtual terminal, and job transfer and manipulation protocols.

Prior art solutions to bandwidth control are typically incorporated within the OSI transport layer; these solutions yield accurate bandwidth control rates but have a significant drawback in that they require the replacement of standardized TCP/IP software that is bundled within common operating systems, which introduces the ability to potentially adversely affect the execution of many applications.

In contrast, the present invention incorporates bandwidth control solely within the application layer. Application layer 216 accepts outgoing data packets 218 and subjects them to processing by bandwidth control module 220 before transferring them as bandwidth-regulated outgoing data packets 222 to lower OSI layers, such as transport layer 210.

The description of the exemplary embodiments of the present invention hereinbelow describe a bandwidth control module as performing various operations. A module represents a software or firmware routine, subroutine, interface, task, process, procedure, function, object-oriented method or object, program, or subprogram that accomplishes a configurable set of computational operations. Thus, it should be noted that the bandwidth control module may comprise multiple interoperating modules.

In addition, the description of the exemplary embodiments of the present invention hereinbelow describe a bandwidth control module as performing the transfer or the transmittal of a given data packet from the application layer in which the bandwidth control module is contained. However, it should be noted that other application processes may perform the actual transfer of a given data packet from the application layer while relying on the bandwidth control solely for its ability to determine an appropriate delay time and/or to introduce a processing delay of an appropriate delay time.

Additionally, the description of the exemplary embodiments of the present invention hereinbelow describe a bandwidth control module as introducing the delay in the transfer or the transmittal of a given data packet from the application layer in which the bandwidth control module is contained. However, it should be noted that other application processes may perform the actual delay of a given data packet from the application layer while relying on the bandwidth control solely for its ability to determine an appropriate delay time.

Figure 3:
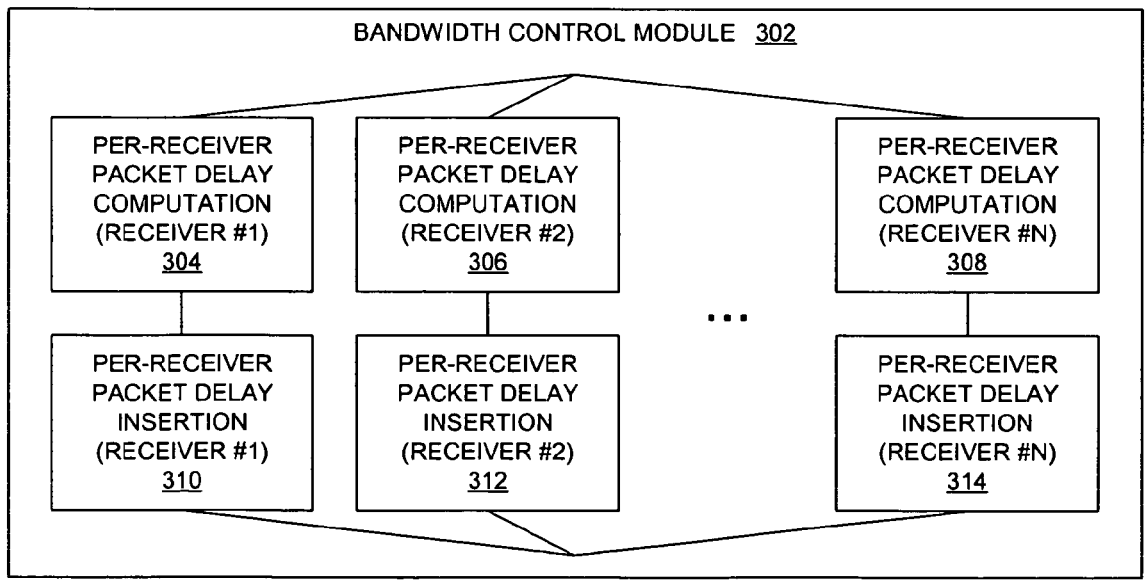
FIG. 3 illustrates a block diagram that shows a bandwidth control module that regulates the bandwidth of outgoing data packets on a per-receiver basis in accordance with the present invention.

With reference now to FIG. 3, a block diagram depicts a bandwidth control module that regulates the bandwidth of outgoing data packets on a per-receiver basis in accordance with the present invention. Bandwidth control module 302 receives a data packet, and depending on the target receiver of the received data packet, bandwidth control module 302 computes a required delay time value for the data packet and then delays any further transference, processing, or transmission of the data packet in accordance with the computed delay time value. Bandwidth control module 302 may immediately transfer some of outgoing data packets without delaying the data packets while other outgoing data packets may be subjected to a computed delay time period. In this manner, bandwidth control module 302 interjects delay periods into the datastreams that are being transmitted to the receivers. Bandwidth control module 302 computes delay periods, e.g., per-receiver packet delay computations 304-308, and interjects delay periods, e.g., per-receiver packet delay insertions 310-314, on a per-receiver basis that depends on configurable bandwidth capacity parameters that reflect the maximum communication bandwidth capacities of the individual receivers and/or the maximum communication bandwidth capacity of the server, as explained in more detail hereinbelow.

Figure 4:
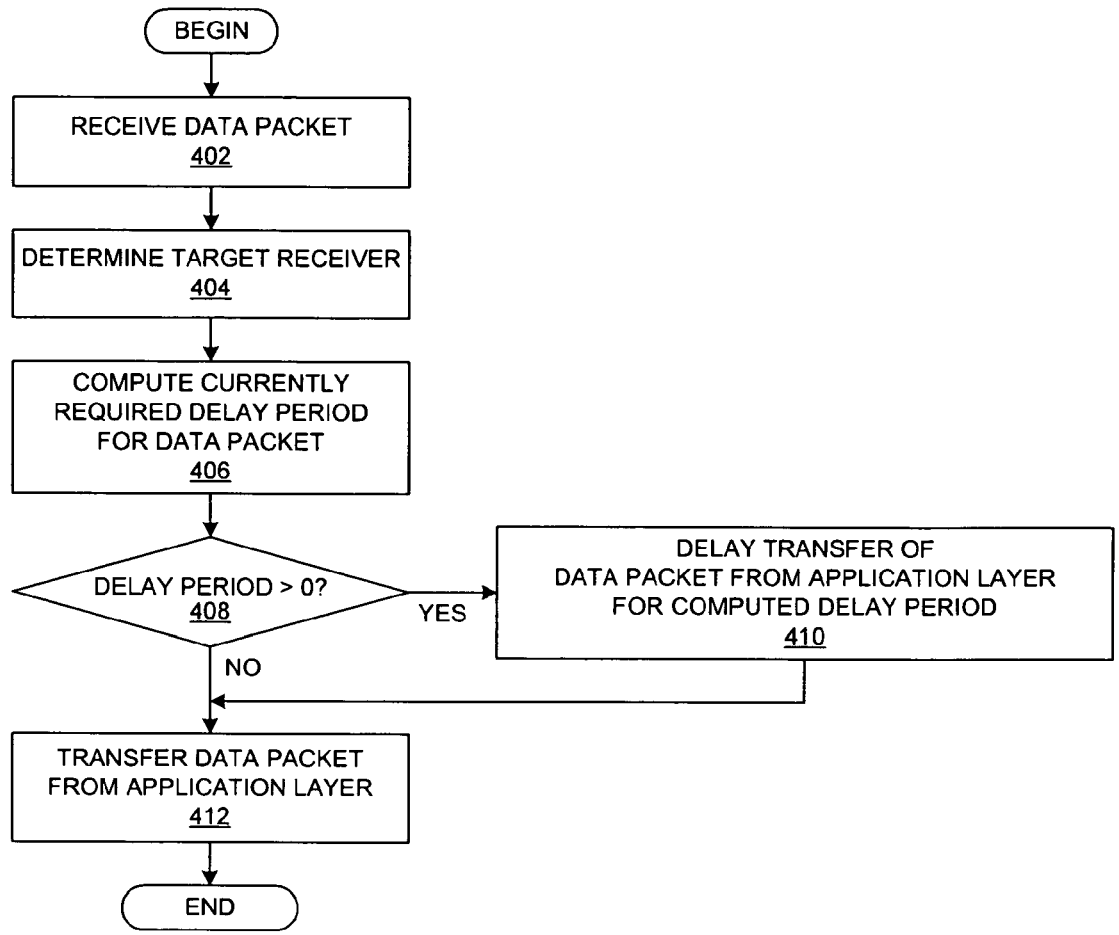
FIG. 4 illustrates a flowchart that shows a generalized process for controlling the data transfer rate with respect to individual data packets in a bandwidth control module within the application layer in accordance with an embodiment of the present invention.

With reference now to FIG. 4, a flowchart depicts a generalized process for controlling the data transfer rate with respect to individual data packets in a bandwidth control module within the application layer in accordance with an embodiment of the present invention. The process commences with the receipt of a data packet (step 402), e.g., at the bandwidth receiving module from an application process. The target receiver for the received data packet is determined (step 404), and the currently required delay period for the data packet is computed (step 406). If the computed delay period is greater than zero (step 408), then the transfer of the data packet is delayed for an amount of time that is approximately equal to the computed delay period (step 410). If it was determined at step 408 that a delay period was not required, then the data packet is released without being specifically delayed in accordance with a computed time delay period. After further processing of the data packet has been delayed or after the data packet has been released without further delay, then the data packet is transferred from the application layer (step 412), e.g., to the transport layer, thereby concluding the process.

Figure 5:
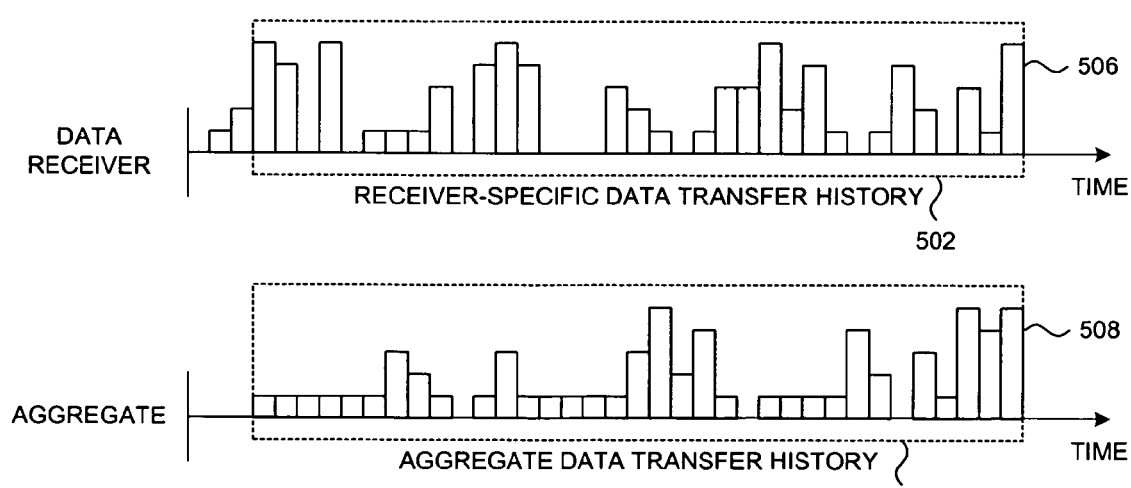
FIG. 5 illustrates a pair of bar graphs that graphically depict data transfer histories over a timeline in which the data transfer histories reflect the bandwidth control that is asserted over receiver-specific datastreams and an aggregate datastream that represents a combination of the receiver-specific datastreams as sent from a server to the multiple data receivers in accordance with the present invention.

With reference now to FIG. 5, a pair of bar graphs graphically depict data transfer histories over a timeline in which the data transfer histories reflect the bandwidth control that is asserted over receiver-specific datastreams and an aggregate datastream that represents a combination of the receiver-specific datastreams as sent from a server to the multiple data receivers in accordance with the present invention. As mentioned previously, a bandwidth control module within the application layer of a server computes delay periods and interjects delay periods on a per-receiver basis that depends on configurable bandwidth capacity parameters that reflect the maximum communication bandwidth capacities of the individual receivers and/or the maximum communication bandwidth capacity of the server. The bandwidth control is accomplished by recording a receiver-specific data transfer history for each receiver while also recording an aggregate data transfer history for all data transfers over all receivers; the recordations of these data transfer histories can be represented as a set of sliding windows of data transfers.

For example, receiver-specific data transfer history 502 represents a sliding window of the data transfers that have been performed on behalf of a single data receiver; each data receiver has a corresponding data transfer history. Aggregate data transfer history 504 represents a sliding window of the data transfers that have been performed on behalf of all data receivers, i.e. all data transmissions from a server to multiple data receivers.

Each entry in receiver-specific data transfer history 502 represents a single data transfer to one data receiver within a particular time period; in other words, each bar within the bar graph 502 represents a single data transfer to a single data receiver. Each entry in aggregate data transfer history 504 represents a data transfer for any data receivers within a particular time period; thus, successive entries in aggregate data transfer history 504 may represent data transfers to different data receivers.

When a data packet is received by the bandwidth control module within the application layer, information about the processing of the data packet is entered into the appropriate receiver-specific data transfer history and also into the aggregate data transfer history. For example, bar 506 represents the most recent data transfer for a particular data receiver within the appropriate receiver-specific data transfer history, and bar 508 represents this data transfer within the aggregate data transfer history. Initially, entries are made into a data transfer history until it is filled with entries; once a data transfer history is filled, then an entry is overwritten to make room for a new entry. However, a data transfer history is sometimes cleared based on inactivity, as explained in more detail further below. In this manner, a data transfer history represents a sliding temporal window for data transfer activity that continually moves forward with new entries.

It should be noted that the vertical axis of the bar graphs is shown as being undefined; e.g., each bar in the bar graphs may represent a number of bytes for a data transfer within a given time period, and the vertical axis of each bar graph may be assumed to be scaled differently. It should also be noted that each bar in the bar graphs represents an entry within a history data structure for a given data transfer; the bar graphs are intended to depict activity over a time period, but the width of the individual bars within the bar graphs do not depict specific time intervals over which a given data transfer occurs. Hence, it should be expected that data packets may be processed in a manner that is temporally random and not spaced in regular intervals as depicted in FIG. 5.

Each entry in a data transfer history has information about the time at which an associated data transfer occurred, e.g., by obtaining a timestamp from a system call to the operation system to obtain so-called wall-clock time. Each entry in a data transfer history also has information about the amount of delay time that has been applied against an associated data transfer to ensure that the attempted data transfer did not exceed a bandwidth capacity parameter. In addition, each entry in a data transfer history has information about the number of bytes that were transmitted for an associated data transfer. Thus, a data transfer history contains information that allows for the computation of an approximate data transfer rate for the set of data transfers that have been recorded within the entries in the data transfer history.

A receiver-specific data transfer history contains information about the times at which data transfers were made from the application layer of the server to a given data receiver and also contains information about the amount of data that was transmitted during those recorded data transfers. An average data transfer rate for a particular data receiver can be computed over a receiver-specific data transfer history by considering the number of bytes that have been transferred over the time period that is represented by the data transfer history, i.e. ((number of bytes)/(amount of time)).

Likewise, the aggregate data transfer history contains information about the times at which data transfers were made from the application layer of the server to any data receivers and also contains information about the amount of data that was transmitted during those recorded data transfers. An average aggregate data transfer rate across the datastreams for all data receivers can be computed over the aggregate data transfer history by considering the number of bytes that have been transferred over the time period that is represented by the data transfer history.

Figure 6:
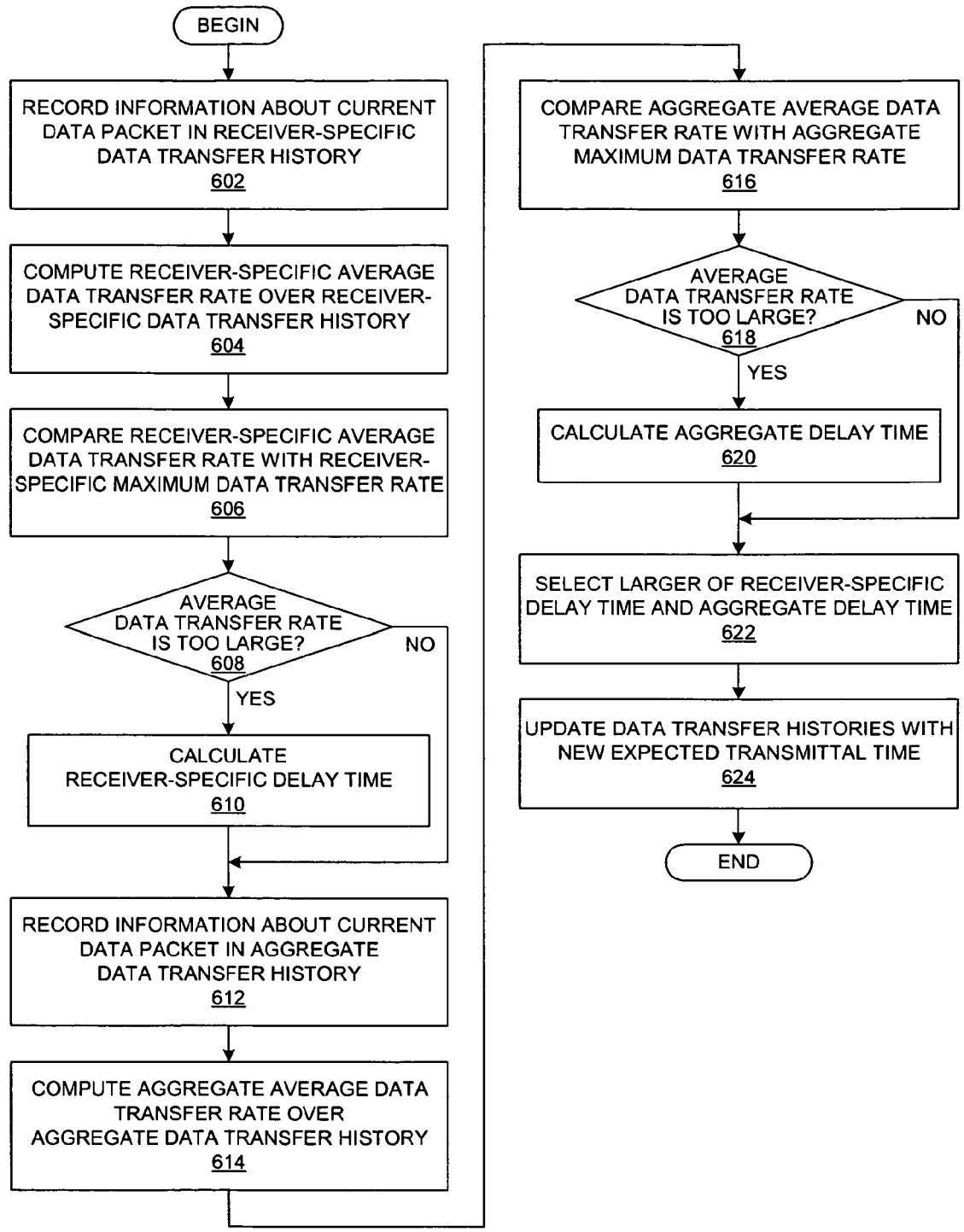
FIG. 6 illustrates a flowchart that shows a process for computing a delay time to be applied to a received data packet in order to decrease an average data transfer rate over a current data transfer history.

With reference now to FIG. 6, a flowchart depicts a process for computing a delay time to be applied to a received data packet in order to decrease an average data transfer rate over a current data transfer history. Given the overview of the present invention that is presented within FIGS. 2-5, the data transfer throttling mechanism of the present invention may be described in more detail; in particular, the process that is shown in FIG. 6 provides more detail for step 406 that is shown in FIG. 4. In general, the bandwidth control module throttles the data transfers to the individual data receivers through the use of a receiver-specific data transfer history and the aggregate data transfer history, which are briefly described above with respect to FIG. 5; detailed data structures for a data transfer history are described in more detail hereinbelow.

When a data packet is received by the bandwidth control module, e.g., as shown at step 402 in FIG. 4, information about the current data packet or the current data transfer, such as the number of bytes in the current data packet and the timestamp for the expected time at which the data packet will be transferred to a data receiver, is recorded in an entry within the receiver-specific data transfer history that is associated with the data receiver to which the current data packet is to be transmitted (step 602). The received data packet is the data packet that is currently being processed; this data packet can be described as the current data packet, and its potential transfer to the appropriate data receiver can be described as the current data transfer. At this point in time, it may be assumed that the current data packet will be transmitted immediately without delay, so the recorded timestamp may simply contain the current system time.

An average data transfer rate for the appropriate data receiver, i.e. the data receiver to which the current data packet will subsequently be transmitted, is computed over the appropriate data receiver's receiver-specific data transfer history, including the current data packet (step 604). If the current data packet contains a sufficient amount of data, then it is possible that the immediate transfer of the data packet would cause the appropriate data receiver's maximum bandwidth capacity to be exceeded; in other words, the number of transferred bytes would be too large for the time period that is represented within the data transfer history.

Hence, the computed data transfer rate is compared with the receiver-specific data transfer rate parameter that is associated with the appropriate data receiver (step 606). If the computed data transfer rate exceeds the maximum threshold as represented by the receiver-specific data transfer rate parameter (step 608), then a receiver-specific delay time is computed (step 610). The computed delay time is an amount of time that the bandwidth control module should wait before transferring the data packet. By delaying the transfer of the current data packet, the amount of time that is represented within the appropriate data receiver's receiver-specific data transfer history would be increased or lengthened, thereby decreasing the average data transfer rate of the appropriate data receiver.

However, the present invention manages the data transfer rates with respect to the bandwidth capacity of the server in addition to the bandwidth capacity of any data receiver. Hence, the bandwidth control module needs to ensure that the aggregate average data transfer rate does not exceed the maximum communication bandwidth capacity of the server in addition to ensuring that the receiver-specific average data transfer rate does not exceed the maximum communication bandwidth capacity of the appropriate data receiver. If the current data packet was delayed in accordance with the receiver-specific delay time that is computed at step 610 and then transferred to the appropriate data receiver, it is possible that the maximum communication bandwidth capacity of the server might be exceeded even though the maximum communication bandwidth capacity of the appropriate data receiver would not be exceeded. Thus, the current data packet must be processed with respect to the aggregate average data transfer rate to check whether the current data packet must be delayed by a greater delay time in order to ensure that the maximum communication bandwidth capacity of the server is not exceeded; the set of steps for processing the current data packet with respect to the aggregate average data transfer rate, i.e. as described below, may be performed in parallel or before steps 602-610 in which the current data packet is processed with respect to a receiver-specific average data transfer rate.

Information about the current data packet of the current data transfer, such as the number of bytes in the current data packet and the timestamp for the expected time at which the data packet will be transferred to a data receiver, is recorded in an entry within the aggregate data transfer history (step 612); the timestamp at step 612 is intended to be the same timestamp that was recorded at step 602.

An average data transfer rate for the server is computed over the aggregate data transfer history, including the current data packet (step 614). If the current data packet contains a sufficient amount of data, then it is possible that the immediate transfer of the data packet would cause the server's maximum bandwidth capacity to be exceeded; in other words, the number of transferred bytes would be too large for the time period that is represented within the data transfer history. Hence, the computed data transfer rate is compared with the aggregate data transfer rate parameter that represents the maximum aggregate data transfer rate of the server (step 616). If the computed data transfer rate exceeds the maximum threshold as represented by the aggregate data transfer rate parameter (step 618), then an aggregate delay time is computed (step 620). The computed delay time is an amount of time that the bandwidth control module should wait before transferring the data packet such that by delaying the transfer of the current data packet, the amount of time that is represented within the aggregate data transfer history would be increased or lengthened, thereby decreasing the average data transfer rate of the server.

It is highly likely that the computed aggregate delay time and the computed receiver-specific delay time are not identical. In order to ensure that the maximum communication bandwidth capacity of the server is not exceeded while also ensuring that the maximum communication bandwidth capacity of the appropriate data receiver is not exceeded, the current data packet must be delayed by whichever computed delay time is greater. Thus, the larger computed delay time is selected (step 622), and the data transfer histories are adjusted as necessary to reflect the expected time at which the current data packet will be transmitted after waiting the selected delay time (step 624); since the expected time for the transmittal of the current data packet was previously recorded as occurring immediately, if the current data packet is to be delayed by the selected delay time, then the expected time for the transmittal of the current data packet must be updated within the data transfer histories accordingly. The selected delay time is the computed delay period that is used within steps 406-410 of FIG. 4, and the process of computing the appropriate delay time is concluded.

Figure 7:
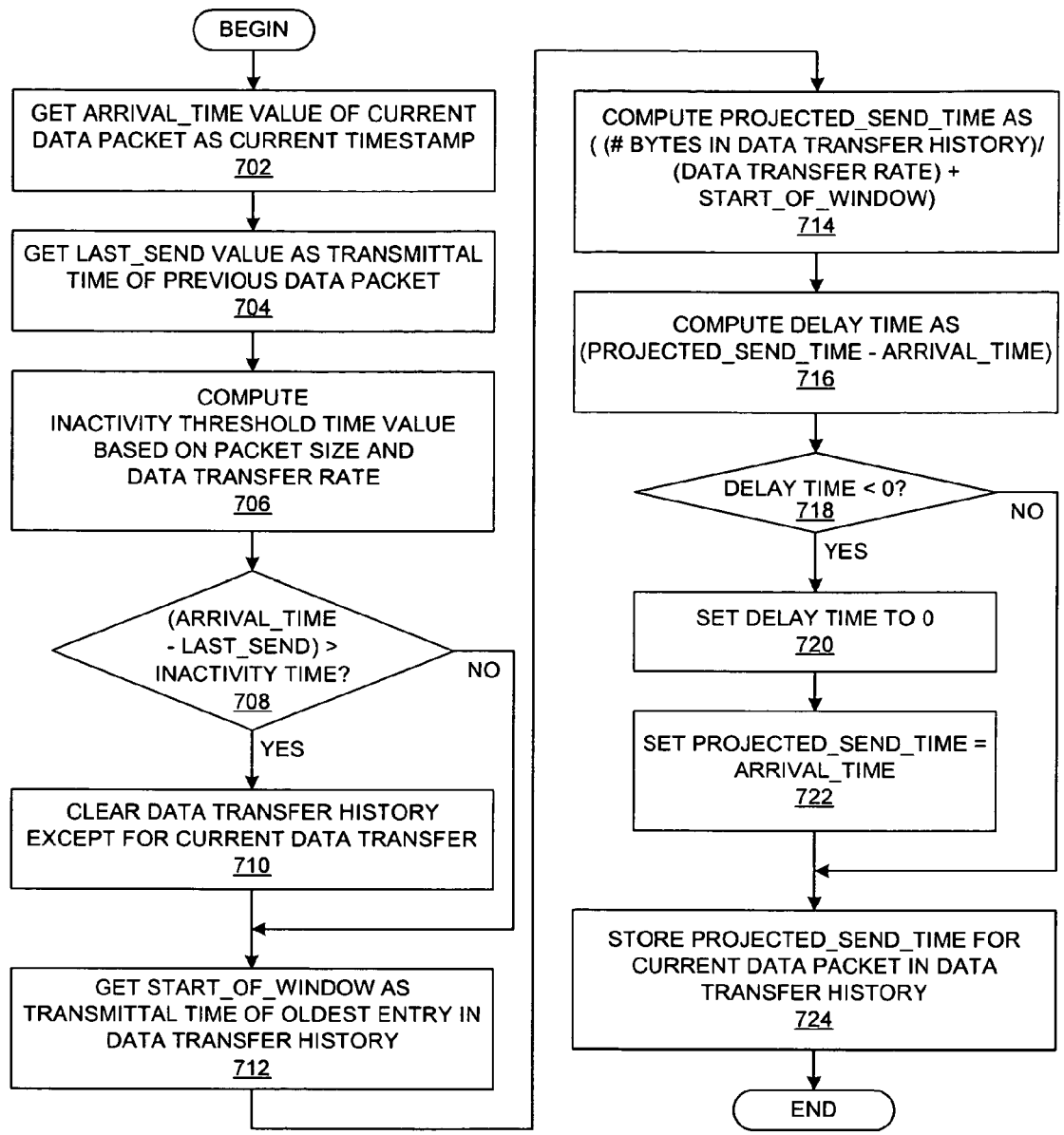
FIG. 7 illustrates a flowchart that shows a process for computing a delay time to be applied against a current data packet in order to delay the current data transfer.

With reference now to FIG. 7, a flowchart depicts a process for computing a delay time to be applied against a current data packet in order to delay the current data transfer. The process that is shown in FIG. 7 may be employed with either the receiver-specific data transfer history or the aggregate data transfer history, depending on which data transfer history is used to extract information. Thus, the process that is shown in FIG. 7 provides further detail for both step 610 and step 620 in FIG. 6.

The process commences by getting the arrival-time value of the current data packet as a timestamp value that represents the current system time (step 702), e.g., through a system call to the operating system. The transmittal time of the previous data packet is then retrieved from the data transfer history as a last-send value (step 704).

An inactivity threshold time value is then computed based on the maximum packet size of any data packet that is sent by the server and based on the maximum data transfer rate that is associated with the data transfer history (step 706). The inactivity threshold time value is explained in more detail hereinbelow with respect to FIG. 8. If the difference between the arrival-time value and the last-send value is greater than the inactivity threshold time value (step 708), then the data transfer history is cleared (step 710), except for the current data transfer that has already been recorded within the data transfer history; otherwise, if the difference is less than the inactivity threshold time value at step 708, then the current data transfer history is not cleared.

A start-of-window time value is obtained by retrieving the transmittal time of the oldest entry in the data transfer history (step 712); the oldest entry represents the oldest data transfer within the sliding window of the data transfer history.

A projected send-time value is then computed by dividing the total number of bytes within the data transfer history by the data transfer rate and adding the resulting value to the start-of-window time value (step 714). The projected send-time value represents a hypothetical point in time at which all bytes within all data packets that are recorded within the data transfer history could have been transferred from the server at the appropriate data transfer rate. With respect to the appropriate data transfer rate, if the process in FIG. 7 is computing a possible delay time with respect to a specific data receiver, then the receiver-specific maximum data transfer rate is employed as the appropriate data transfer rate at step 714; if the process in FIG. 7 is computing a possible delay time with respect to the aggregate data transfers by the server, then the aggregate maximum data transfer rate is employed as the appropriate data transfer rate at step 714. The relationship between the projected send-time value and the delay time is explained in more detail hereinbelow with respect to FIG. 9.

The delay time value is then computed as the difference between the projected send-time value and the arrival-time value (step 716). A determination is made as to whether the delay time value is less than zero (step 718); if so, then the arrival-time of the current data packet is after the projected send-time value, and the current data packet can be transferred immediately without any further delay. The delay time is reset to zero (step 720) to signify that no delay is necessary. The projected send-time value is set equal to the arrival-time (step 722), which is approximately the time at which the current data packet would be transmitted without further delay. The projected send-time value is then stored in the appropriate entry for the current data packet within the data transfer history (step 724), and the process is concluded. If the delay time value is not less than zero, then the projected send-time value is after the arrival-time of the current data packet; the current data packet cannot be transferred immediately and needs to be delayed for an amount of time represented by the delay time value; the process branches to step 724 to store the projected sent-time value, and the process is concluded. The calculated delay time is then used as the receiver-specific delay time at step 610 in FIG. 6 or as the aggregate delay time at step 620 in FIG. 6.

Figure 8:
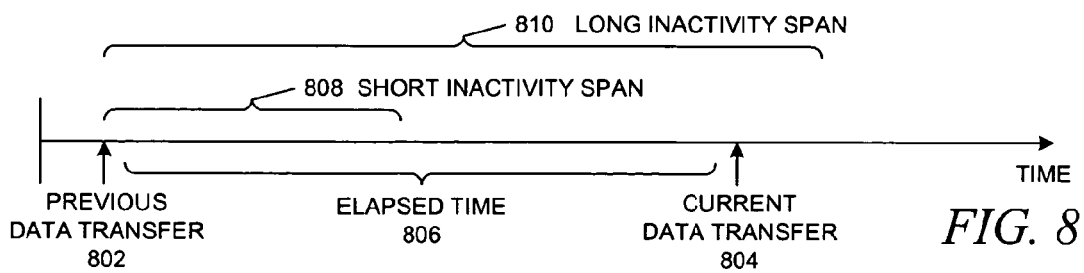
FIG. 8 illustrates a set of time points along a timeline that shows the relationships between an inactivity threshold time value and various data transfers.

With reference now to FIG. 8, a set of time points along a timeline depict the relationships between an inactivity threshold time value and various data transfers. FIG. 8 illustrates the significance of the inactivity threshold time value as mentioned above with respect to step 706 in FIG. 7. An inactivity threshold time value is computed based on the maximum packet size of any data packet that is sent by the server and based on the maximum data transfer rate that is associated with the data transfer history. With respect to the appropriate data transfer rate, if the process in FIG. 7 is computing a possible delay time with respect to a specific data receiver, then the appropriate receiver-specific maximum data transfer rate is employed as the maximum data transfer rate at step 706; if the process in FIG. 7 is computing a possible delay time with respect to the aggregate data transfers by the server, then the aggregate maximum data transfer rate is employed as the maximum data transfer rate at step 706. The computation of the inactivity threshold time value may have a multiplicative scaling factor, or alternatively, the computation may incorporate other parameters.

The inactivity threshold time value represents the minimum time span between data transfers within the data transfer history such that the bandwidth control module does not need to worry about the transmittal time of a subsequent data transfer. In other words, if the time span between the current data transfer and the previous data transfer exceeds the inactivity threshold time value, then it is probable that the transmittal of the current data transfer would not cause the average data transfer rate to exceed the maximum data transfer rate.

Referring to FIG. 8, time point 802 for a previous data transfer is indicated as occurring before time point 804 for the current data transfer; the time difference between the two time points may be considered as elapsed time 806. Relatively long inactivity threshold time value 808 is greater than the elapsed time; in this case, the immediate transfer of the current data packet is considered as having the possibility of increasing the average data transfer rate of the data transfer history past the maximum data transfer rate, depending upon the temporal spacing of the data transfers within the data transfer history and the amount of data in those data transfers, because an insufficient amount of time has passed for the average data transfer rate to be considered as having become quiescent. Relatively short inactivity threshold time value 810 is less than the elapsed time; in this case, the immediate transfer of the current data packet is considered as not having the possibility of increasing the average data transfer rate of the data transfer history past the maximum data transfer rate, no matter what the temporal spacing of the data transfers within the data transfer history and the amount of data in those data transfers, because a sufficient amount of time has passed for the average data transfer rate to be considered as having become quiescent.

Figure 9:
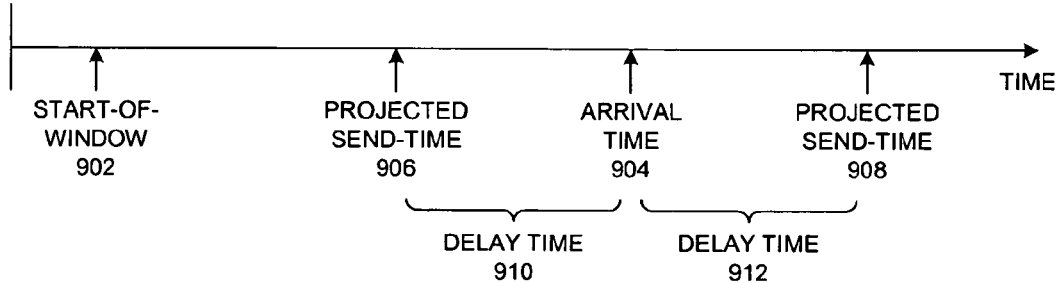
FIG. 9 illustrates a set of time points along a timeline that shows the relationships between a projected send-time value and the delay time.

With reference now to FIG. 9, a set of time points along a timeline depict the relationships between a projected send-time value and the delay time. FIG. 9 illustrates the significance of the projected send-time value as mentioned above with respect to step 714 in FIG. 7.

Start-of-window time value 902 is obtained by retrieving the transmittal time of the oldest entry in the data transfer history; the oldest entry represents the oldest data transfer within the sliding window of the data transfer history. Arrival-time value 904 for the current data packet is obtained as a timestamp value that represents the system time at which the current data packet arrived for processing by the bandwidth control module.

A projected send-time value is computed by dividing the total number of bytes within the data transfer history by the data transfer rate and adding the resulting value to start-of-window time value 902. The projected send-time value represents a hypothetical point in time at which all bytes within all data packets that are recorded within the data transfer history could have been transferred from the server at the appropriate data transfer rate. FIG. 9 shows two possible time points: time point 906 represents a hypothetical point in time that is earlier than the arrival time, and time point 908 represents a hypothetical point in time that is later than the arrival time.

The delay time is computed as the difference between the projected send-time value and the arrival-time value. The example in FIG. 9 shows two possible delay times for the two possible projected send-time values: delay time 910 is a negative value because the projected send-time value is earlier than the arrival time, and delay time 912 is a positive value because the projected send-time value is later than the arrival time.

Delay time 910 represents a situation in which all previous data transfers have hypothetically been completed before the arrival time; hence, the current data packet does not need to be delayed before immediately transferring the current data packet because the transmittal of the current data packet cannot cause the average data transfer rate to overutilize the available bandwidth, i.e. cannot cause the maximum threshold limit on the bandwidth to be surpassed in either case of the aggregate bandwidth of the server or a receiver-specific bandwidth, depending on which delay time value is being calculated or considered.

Delay time 912 represents a situation in which all previous data transfers hypothetically have not been completed before the arrival time; hence, the current data packet needs to be delayed before transferring the current data packet because the transmittal of the current data packet may cause the average data transfer rate to overutilize the available bandwidth, i.e. may cause the maximum threshold limit on the bandwidth to be surpassed in either case of the aggregate bandwidth of the server or a receiver-specific bandwidth, depending on which delay time value is being calculated or considered. In this scenario, the current data packet is eventually delayed in accordance with the calculated delay time, e.g., at step 410 in FIG. 4.

Figure 10:
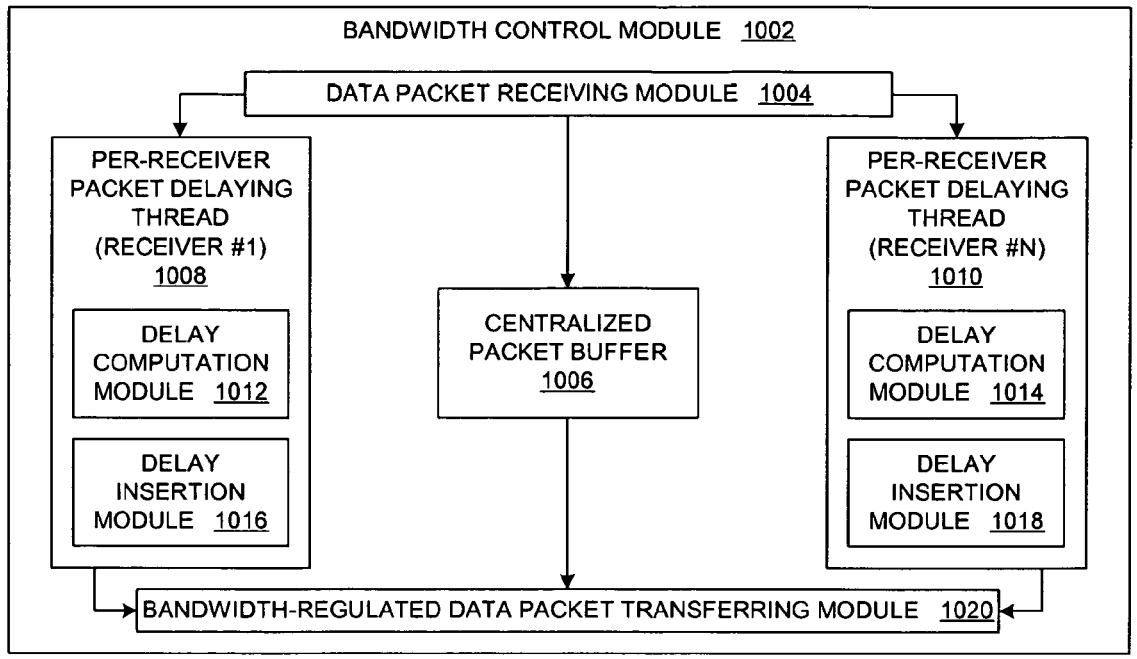
FIG. 10 illustrates a block diagram that shows a multi-threaded mechanism for throttling datastreams using a centralized data buffer in a bandwidth control module within the application layer of a server in accordance with an embodiment of the present invention.
Figure 11:
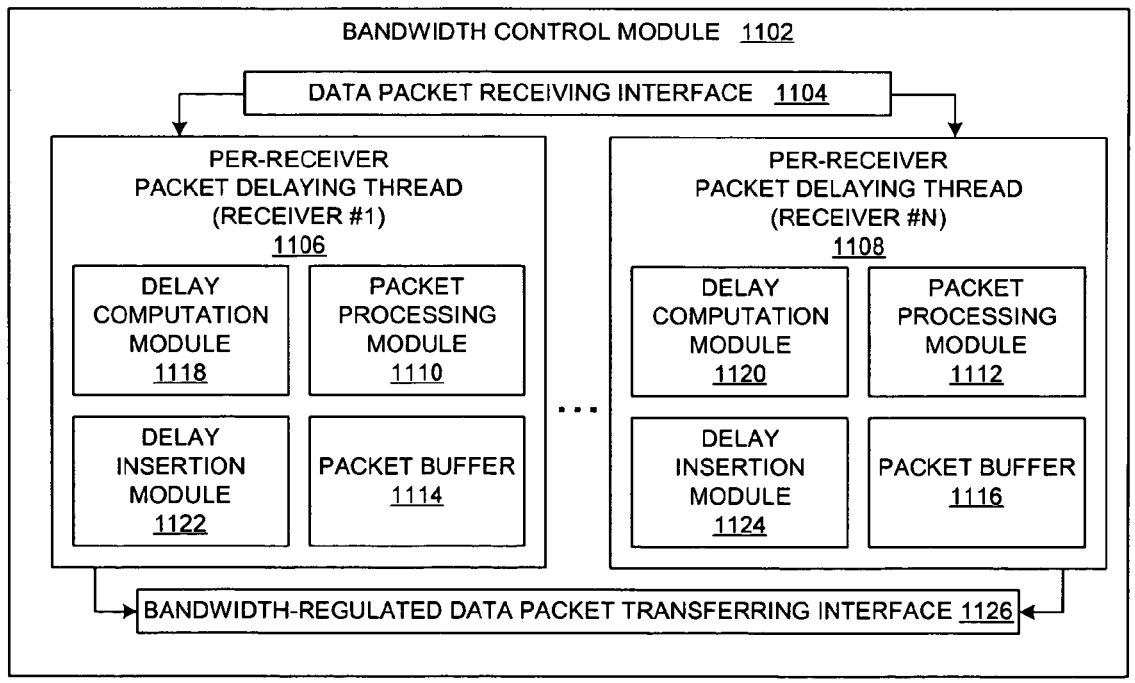
FIG. 11 illustrates a block diagram that shows a multi-threaded mechanism for throttling datastreams using multiple packet buffers associated with per-receiver packet delaying threads in a bandwidth control module within the application layer of a server in accordance with an embodiment of the present invention.

A variety of mechanisms may be implemented within the bandwidth control module for processing the per-receiver datastreams in different implementations of the present invention; for example, FIG. 10 and FIG. 11 depict different multi-threaded mechanisms for handling the processing of the data packets according to computed time delay values. However, these figures show alternative embodiments of the present invention in order to illustrate that the present invention is directed to computing and inserting time delays on a per-receiver basis that is not dependent on the manner in which the individual data packets are handled; different embodiments of the present invention may be implemented in conjunction with a variety of mechanisms for storing and handling outgoing data packets without affecting the present invention.

With reference now to FIG. 10, a block diagram depicts a multi-threaded mechanism for throttling datastreams using a centralized data buffer in a bandwidth control module within the application layer of a server in accordance with an embodiment of the present invention. Bandwidth control module 1002 contains data packet receiving module 1004, which stores data packets into centralized data buffer 1006 as they are received from other application processes. In the exemplary embodiment that is shown in FIG. 10, each data receiver has an associated thread such that there is a one-to-one correspondence between data receivers and packet delaying threads. After determining the target receiver for a received data packet, data packet receiving module 1004 notifies the appropriate per-receiver packet delaying thread, such as thread 1008 or thread 1010, of the storage location of the received data packet, e.g., by calling a routine within the appropriate per-receiver packet delaying thread using an input variable that contains a pointer to the received data packet.

The appropriate thread then ensures that the data packet is delayed as necessary using its delay computation module and its delay insertion module, e.g., delay computation modules 1012 and 1014 and delay insertion modules 1016 and 1018 within respective threads 1008 and 1010. After a given data packet has been delayed as necessary, then the appropriate per-receiver packet delaying thread notifies bandwidth-regulated data packet transferring module 1020 that the given data packet is ready to be transmitted, e.g., by having the appropriate per-receiver packet delaying thread call a routine within bandwidth-regulated data packet transferring module 1020 using an input variable that contains a pointer to the given data packet. Bandwidth-regulated data packet transferring module 1020 transfers data packets from the application layer to lower OSI layers, such the transport layer.

With reference now to FIG. 11, a block diagram depicts a multi-threaded mechanism for throttling datastreams using multiple packet buffers associated with per-receiver packet delaying threads in a bandwidth control module within the application layer of a server in accordance with an embodiment of the present invention. Bandwidth control module 1102 contains data packet receiving interface 1104. As data packets are received from other application processes, data packet receiving interface 1104 transfers data packets to an appropriate per-receiver packet delaying thread, such as thread 1106 or thread 1108, after determining the target receiver for a received data packet; in the exemplary embodiment that is shown in FIG. 11, each data receiver has an associated thread such that there is a one-to-one correspondence between data receivers and packet delaying threads. Data packet receiving interface 1104 passes the received data packet to the appropriate per-receiver packet delaying thread, e.g., by calling a routine within its packet processing module, e.g., packet processing module 1110 or 1112, which stores the received data packet into its respective packet buffer, e.g., packet buffer 1114 or 1116.

The appropriate thread then ensures that the data packet is delayed as necessary using its delay computation module and its delay insertion module, e.g., delay computation modules 1118 and 1120 and delay insertion modules 1122 and 1124 within respective threads 1106 and 1108. After a given data packet has been delayed as necessary, then the appropriate per-receiver packet delaying thread transfers the given data packet to bandwidth-regulated data packet transferring interface 1126. Bandwidth-regulated data packet transferring interface 1126 transfers data packets from the application layer to lower OSI layers, such the transport layer.

Figure 12:
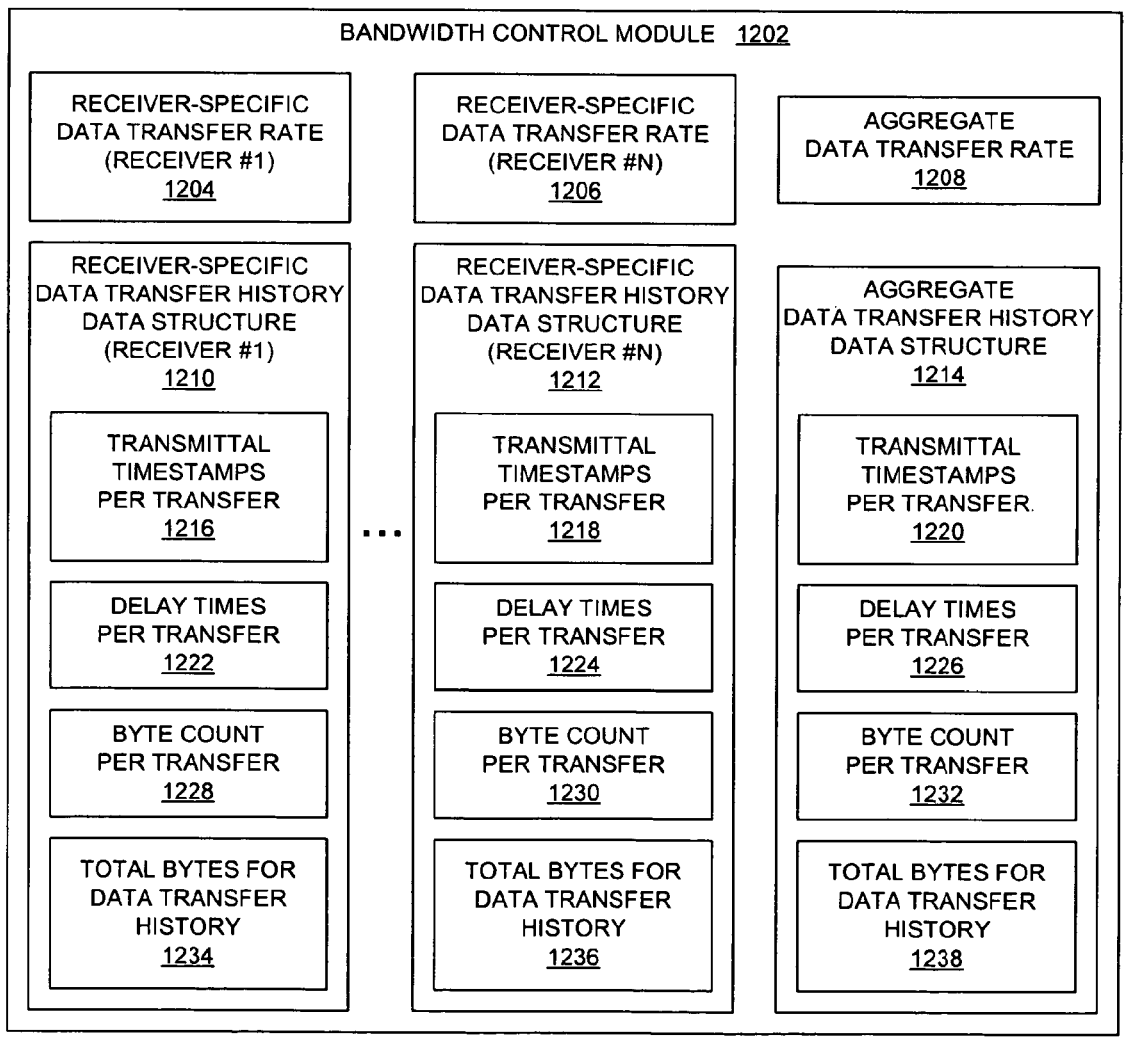
FIG. 12 illustrates a block diagram that shows some of the parameters and data structures that are used by the bandwidth control module to monitor the data transfer histories in accordance with the present invention.

With reference now to FIG. 12, a block diagram depicts some of the parameters and data structures that are used by the bandwidth control module to monitor the data transfer histories in accordance with the present invention. Bandwidth control module 1202 maintains receiver-specific data transfer rate parameters 1204-1206 for each data receiver; in other words, a unique data transfer rate parameter is associated with each data receiver. A particular data transfer rate parameter represents a maximum bandwidth capacity that is available for use by the server when sending data to a given data receiver; in an alternative but similar interpretation, a data transfer rate parameter represents the maximum data rate that can be consumed by a given data receiver with respect to a datastream from the server to the given data receiver. Bandwidth control module 1202 also maintains aggregate data transfer rate parameter 1208, which represents a maximum bandwidth capacity that is available for use by the server for data transfers to all data receivers in total; in an alternative interpretation, the aggregate data transfer rate parameter represents the maximum data rate that can be consumed by all data receivers across all datastreams from the server to the data receivers. The data transfer rate parameters may be configurable through a customized administrative utility application under the control of an authorized system administrator.

Bandwidth control module 1202 manages receiver-specific data transfer history data structures 1210-1212 for each data receiver; in other words, a unique data transfer history data structure is associated with each data receiver. A particular data transfer history data structure stores information about the individual data transfers that have been performed, including a current data transfer that may be in the process of being performed. Thus, a receiver-specific data transfer history data structure contains information about the data transfers for a given data receiver. Bandwidth control module 1202 also manages aggregate data transfer history data structure 1214, which contains information about the data transfers for all data receivers. The size of the data transfer history data structures, i.e. the storage capacity or the number of entries, may be configurable through a customized administrative utility application under the control of an authorized system administrator.

Each receiver-specific data transfer history data structure contains temporal information about the approximate time at which a given data transfer occurred for a given data receiver; in other words, each receiver-specific data transfer history data structure contains a set of time values within a time period covered by the data transfer history for the set of data transfers that have occurred within the data transfer history for a given data receiver, e.g., transmittal timestamps 1216 for one data receiver and transmittal timestamps 1218 for a different data receiver. Likewise, aggregate data transfer history data structure 1214 contains temporal information about the approximate times at which any data transfers occurred from the server to any data receivers; in other words, aggregate data transfer history data structure 1214 contains a set of time values within a time period covered by the data transfer history for all data transfers that have occurred from the server to all data receivers, e.g., as represented by transmittal timestamps 1220. The transmittal timestamps may be stored in any appropriate data structure, such as a circular queue with associated head and tail index pointers.

Each receiver-specific data transfer history data structure contains temporal information about the approximate delay time that was applied against a given data transfer for a given data receiver; in other words, each receiver-specific data transfer history data structure contains a set of delay time values within a time period covered by the data transfer history for the set of data transfers that have occurred within the data transfer history for a given data receiver, wherein each delay time value represents an amount of time that a given data transfer was held within the application layer before being released for transfer from the application layer, e.g., delay times 1222 for one data receiver and delay times 1224 for a different data receiver. Likewise, aggregate data transfer history data structure 1214 contains temporal information about the approximate delay times that were applied against any data transfers from the server to any data receivers; in other words, aggregate data transfer history data structure 1214 contains a set of delay time values within a time period covered by the data transfer history for all data transfers that have occurred from the server to all data receivers, wherein each delay time value represents an amount of time that a given data transfer was held within the application layer before being released for transfer from the application layer, e.g., as represented by delay times 1226. The delay time values may be stored in any appropriate data structure, such as a circular queue with associated head and tail index pointers.

Each receiver-specific data transfer history data structure contains information about the number of bytes that were transferred within a given data transfer for a given data receiver; in other words, each receiver-specific data transfer history data structure contains a set of byte count values within a time period covered by the data transfer history for the set of data transfers that have occurred within the data transfer history for a given data receiver, wherein each byte count value represents the number of bytes in a given data transfer from the application layer, e.g., byte counts 1228 for one data receiver and byte counts 1230 for a different data receiver. Likewise, aggregate data transfer history data structure 1214 contains information about the number of bytes that were transferred within any data transfers from the server to any data receivers; in other words, aggregate data transfer history data structure 1214 contains a set of byte count values within a time period covered by the data transfer history for all data transfers that have occurred from the server to all data receivers, wherein each byte count value represents the number of bytes in a given data transfer from the application layer, e.g., as represented by byte counts 1232. The byte count values may be stored in any appropriate data structure, such as a circular queue with associated head and tail index pointers.

Each receiver-specific data transfer history data structure contains a data value that represents the total number of bytes that were transferred for a given data receiver within the current data transfer history, e.g., byte count 1234 for one data receiver and byte count 1236 for a different data receiver. Likewise, aggregate data transfer history data structure 1214 contains a data value that represents the total number of bytes that were transferred within any data transfers from the server to any data receivers within the current data transfer history, e.g., as represented by byte count 1238.

Table 1 contains pseudo-code statements for a top-level function that employs thread sleeping as a mechanism for injecting delays into the transferring of data packets from the application layer of a server in accordance with an embodiment of the present invention. Prior to the bandwidth control module transferring the current data packet from the OSI application layer to the OSI transport layer, higher-level application functions call the "do_sendPacket_delay" function in order to inject a delay into the processing of a data packet if necessary.

The variable "aggregate_senddelay" is the data transfer history data structure that contains the last "N" data transfers from the server to any data receiver; this data transfer history is used to control the aggregate average data transfer rate from the server to the data receivers. The "aggregate_rate" variable is the aggregate maximum transfer rate or bandwidth capacity from the server to the data receivers. The "packet_size" variable is the number of bytes that is passed at a time from the application layer to the transport layer, e.g., the number of bytes that are passed in a single call to a TCP API. The variable "receiver_senddelay" is the receiver-specific data transfer history data structure that contains the last "N" data transfers from the server to a specific data receiver; this data transfer history is used to control the receiver-specific average data transfer rate from the server to the specific data receiver that will receive the current data packet.

TABLE 1

```
void do_sendPacket_delay(
        sendDelay_t **aggregate_senddelay,
        sendDelay_t **receiver_senddelay,
        long aggregate_rate,
        long receiver_rate,
        long packet_size,
        short slow_link)
{
        struct timeval *aggregate_stime;
        struct timeval *receiver_stime;
```

TABLE 1-continued

```
        struct timeval *final_stime;
        aggregate_stime = sendDelay(
            aggregate_rate,
            packet_size,
            aggregate_senddelay,
            slow_link);
        receiver_stime = sendDelay(
            receiver_rate,
            packet_size,
            receiver_senddelay,
            slow_link);
        final_stime =
        ((receiver_stime->tv_sec > aggregate_stime->tv_sec) ||
            ((receiver_stime->tv_sec == aggregate_stime->tv_sec) &&
            (receiver_stime->tv_usec > aggregate_stime->tv_usec))) ?
                receiver_stime : aggregate_stime;
        adjustWindow(*aggregate_senddelay, *receiver_senddelay);
        if ( (final_stime->tv_usec > 0) ||
            (final_stime->tv_sec > 0)) {
                do_thread_sleep(final_stime)
        }
        free(aggregate_stime);
        free(receiver_stime);
}
```

In the "do_sendPacket_delay" function that is shown in Table 1, the aggregate delay time that is calculated to ensure that aggregate data transfers use less bandwidth than is specified by the aggregate maximum data transfer rate, and the receiver-specific delay time is calculated to ensure that the data transfers, including the current data packet, to a particular data receiver employ less bandwidth than is specified by the receiver-specific maximum data transfer rate. The larger of the aggregate delay time and the receiver-specific delay time is used to delay the transfer of the current data packet from the OSI application layer to the OSI transport layer.

Table 2 contains pseudo-code statements for defining or declaring a data transfer history or a data transfer sliding window.

TABLE 2

```
#define MAX_HISTORY_SIZE 128
typedef struct _sendDelay
{
        long            rate;
        long            newestEntryIndex;   /* index of newest history entry*/
        long            oldestEntryIndex;   /* index of oldest history entry*/
        long            bytesInWindow;      /* total count of number of bytes
                                               sent within history array */
    /* History Information */
        double          timeSent[MAX_HISTORY_SIZE];
        long            bytesSent[MAX_HISTORY_SIZE];
        double          delayTime[MAX_HISTORY_SIZE];
} sendDelay_t;
```

Table 3 contains pseudo-code statements for a "sendDelay" function, which calculates the delay time based on the data in a data transfer history. The "sendDelay" function is called twice from the "do_sendPacket_delay" function: once to calculate the aggregate delay time, and another time to calculate the receiver-specific delay time.

Under certain conditions, the data within the data transfer history is deleted or erased. One of these conditions occurs when there is a long time gap between data transfers. Since the algorithm uses data from the previous "N" data transfers, a long time gap between data transfers may be followed by a long interval of data transfers separated by no delay. Thus, the "slow_link" parameter controls the amount of remedial transferring that the algorithm will perform. Depending on the network traffic when the "slow_link" parameter is TRUE, then the long-term average data transfer rate will be less than the specified maximum data transfer rate. However, when the "slow_link" parameter is FALSE, the long-term average data transfer rate will be much closer to the specified maximum data transfer rate. In this manner, the approximation of the long-term average data transfer rate is balanced with the potential for short-term saturation of the datastream(s).

TABLE 3

```
struct timeval *
sendDelay(long rate, long packetSize, sendDelay_t **tokenPtr, bool_t
slow_link)
{
        sendDelay_t     *sendDelayPtr;
        struct timeval  *sleepTime;
        unsigned long   seconds,microSeconds;
        double          arrivalTime;
        double          delayTime;
        double          projectedSendTime;
        double          windowDelayTime;
        double          startOfWindow;
        double          endOfWindow, lastSend;
        double          elapsedTime; /* the amount of time from start of
window to current time */
        double          threshold;
/* Log data on entry and convert pointer. */
        sendDelayPtr = (sendDelay_t *) *tokenPtr;
        delayTime = 0.0;
        sleepTime = mg_calloc(1, sizeof(struct timeval));
/* Do we need to allocate the structure used to store information. */
        if (sendDelayPtr == NULL)
        {
                sendDelayPtr = (sendDelay_t *) mg_calloc(1, sizeof(sendDelay_t));
                *tokenPtr = sendDelayPtr;
        }
        lastSend = sendDelayPtr->timeSent[sendDelayPtr->newestEntryIndex];
        currentTime(&seconds, µSeconds);
        arrivalTime = seconds + microSeconds/1000000.00;
        if (slow_link)
                threshold = 2*packetSize/rate;
        else
                threshold = 200*packetSize/rate;
```

TABLE 3-continued

```
/* Has the caller requested a data transfer rate change or */
/* has the elapsed time since the last data transfer exceeded the */
/* threshold? The second scenario may occur when data distribution */
/* resumes after being paused for some period of time. */
    if ((rate != sendDelayPtr->rate) ||
                (arrivalTime-lastSend > threshold))
    {   /* Yes, so clear all information */
            memset(sendDelayPtr, 0, sizeof(sendDelay_t));
            sendDelayPtr->newestEntryIndex    = MAX_HISTORY_SIZE-1;
            sendDelayPtr->oldestEntryIndex    = 0;
            sendDelayPtr->rat                 = rate;
    }
    startOfWindow = sendDelayPtr->timeSent[sendDelayPtr->oldestEntryIndex];
    endOfWindow   = sendDelayPtr->timeSent[sendDelayPtr->newestEntryIndex];
    elapsedTime   = arrivalTime-startOfWindow;
/* Do we have any history information? */
    if (sendDelayPtr->bytesInWindow == 0) {
        /* This is the first entry so no delay is necessary. */
        elapsedTime          = 0.0;
        projectedSendTime    = arrivalTime;
        sleepTime->tv_sec    = 0;
        sleepTime->tv_usec   = 0; }
    else
    {
        /* History information exists, so calculate the delay time   */
        /* based on the past information and the net spacing value.  */
        windowDelayTime   = sendDelayPtr->bytesInWindow/rate;
        projectedSendTime = windowDelayTime + startOfWindow;
        delayTime         = projectedSendTime-arrivalTime;
        /* Are we behind the current average data transfer rate? */
        if (delayTime <= 0.00) {
            /* Yes, so no delay is necessary based on rate values */
            projectedSendTime = arrivalTime;
            delayTime          = 0.0;
            sleepTime->tv_sec  = 0;
            sleepTime->tv_usec = 0;
        }
        else
        { /* No, so delay is necessary. */
            sleepTime->tv_sec = delayTime;
            sleepTime->tv_usec = (delayTime - sleepTime->tv_sec)* 1000000.00);
        }
    } /* end of History information exists */
/* Update the history prior to sleep to allow other threads to see it.*/
    updateHistory(sendDelayPtr,
                  packetSize,
                  projectedSendTime,
                  delayTime);
    return sleepTime;
}
```

Table 4 contains pseudo-code statements for updating a data transfer history to shift the window of data.

TABLE 4

```
void updateHistory(sendDelay_t *sendDelayPtr,
        long           packetSize,
        double         sendTime,
        double         delayTime)
{
long saveBytesSent;
/* This routine will manage the updating of information into the */
/* history array. Initially the first index is assigned to the */
/* last entry and the last index is set to zero. It uses a circular */
/* buffer to save the historical information. */
/* Adjust the first index to the next logical position. This works */
/* because it initially sets the first index to the last position. */
sendDelayPtr->newestEntryIndex = (sendDelayPtr->newestEntryIndex + 1) %
MAX_HISTORY_SIZE;
/* Remove the bytes from the entry that will become the new first. */
saveBytesSent = sendDelayPtr->bytesSent[sendDelayPtr->newestEntryIndex];
sendDelayPtr->bytesInWindow -=
sendDelayPtr->bytesSent[sendDelayPtr->newestEntryIndex];
/* Now save the current bytes to be sent and the time at when */
/* the data transfer is expected to occur. */
/* Also, increment the total number of bytes within the window. */
```

TABLE 4-continued

```
    sendDelayPtr->bytesSent[sendDelayPtr->newestEntryIndex] = packetSize;
    sendDelayPtr-> timeSent[sendDelayPtr->newestEntryIndex] = sendTime;
    sendDelayPtr-> delayTime[sendDelayPtr->newestEntryIndex] = delayTime;
    sendDelayPtr->bytesInWindow += packetSize;
/* The following check is needed to allow the array to fill up before    */
/* the last index is adjusted. When the array containing the data is     */
/* created or reset the values for bytesSent are set to zero. Since      */
/* zero is an invalid number, it is used to represent an unused entry.   */
if (saveBytesSent != 0)
    { /* Adjust the last index */
    sendDelayPtr->oldestEntryIndex = (sendDelayPtr->newestEntryIndex+1) %
MAX_HISTORY_SIZE;
    }
    return;
}
```

Table 5 contains pseudo-code statements for adjusting the data transfer histories. Since there are two competing sliding windows that are represented by the data transfer histories, i.e. the aggregate data transfer history and the receiver-specific data transfer history, the sliding windows need to be adjusted such that the selected delay time, i.e. the choice of the larger of the computed aggregate delay time and the computed receiver-specific delay time, is reflected within both sliding windows.

the aggregate data transfer history in which the historical information about previous data transfers is maintained as a temporal sliding window of information. The information in the data transfer histories is reviewed to ensure that a current data transfer does not cause a maximum bandwidth parameter to be exceeded. If the average data transfer rate would be increased above the threshold specified by the maximum bandwidth parameter, then the data transfer for the current data packet is delayed for enough time to ensure that the

TABLE 5

```
void
adjustWindow(sendDelay_t *aggregate_delay, sendDelay_t *receiver_delay)
{
/*
 * Adjust the historic information in the aggregate delay window to
 * reflect the possible extra delay in the receiver window.
 * Adjust the historic information in the receiver delay window to
 * reflect the possible extra delay in the aggregate window.
 */
receiver_delay_time =
receiver_delay->delayTime[receiver_delay->newestEntryIndex];
aggregate_delay_time =
aggregate_delay->delayTime[aggregate_delay->newestEntryIndex];
if (receiver_delay_time > aggregate_delay_time) {
        aggregate_delay->timeSent[aggregate_delay->newestEntryIndex] +=
            (receiver_delay_time-aggregate_delay_time);
        aggregate_delay->delayTime[aggregate_delay->newestEntryIndex] =
            receiver_delay_time;
}
if (aggregate_delay_time > receiver_delay_time) {
    receiver_delay->timeSent[receiver_delay->newestEntryIndex] +=
            (aggregate_delay_time-receiver_delay_time);
    receiver_delay->delayTime[receiver_delay->newestEntryIndex] =
            aggregate_delay_time;
}
return;
}
```

The advantages of the present invention should be apparent in view of the detailed description of the invention that is provided above. Prior art solutions to bandwidth control are typically incorporated within the OSI transport layer; these solutions yield accurate bandwidth control rates but have a significant drawback in that they require the replacement of standardized TCP/IP software that is bundled within common operating systems, which introduces the ability to potentially adversely affect the execution of many applications.

In contrast, the present invention incorporates bandwidth control within the application layer, and the bandwidth control module is able to control bandwidth utilization solely from the application layer. A bandwidth control module throttles the data transfers to the individual data receivers through the use of a receiver-specific data transfer history and average data transfer rate would not be increased above the threshold specified by the maximum bandwidth parameter. The bandwidth control module computes delay periods and interjects delay periods on a per-receiver basis and on an aggregate basis. The per-receiver basis depends on configurable bandwidth capacity parameters that reflect the maximum communication bandwidth capacities of the individual receivers, and the aggregate basis depends on the maximum communication bandwidth capacity of the server, thereby allowing for bandwidth control over datastreams to individual data receivers and over an aggregation of the datastreams to all data receivers. After a data packet has been sufficiently delayed, if necessary, then the bandwidth control module transfers the current data packet from the application layer to the transport layer for transmittal to a data receiver.

It is important to note that while the present invention has been described in the context of a fully functioning data processing system, those of ordinary skill in the art will appreciate that the processes of the present invention are capable of being distributed in the form of instructions in a computer readable medium and a variety of other forms, regardless of the particular type of signal bearing media actually used to carry out the distribution. Examples of computer readable media include media such as EPROM, ROM, tape, paper, floppy disc, hard disk drive, RAM, and CD-ROMs and transmission-type media, such as digital and analog communications links.

A method is generally conceived to be a self-consistent sequence of steps leading to a desired result. These steps require physical manipulations of physical quantities. Usually, though not necessarily, these quantities take the form of electrical or magnetic signals capable of being stored, transferred, combined, compared, and otherwise manipulated. It is convenient at times, principally for reasons of common usage, to refer to these signals as bits, values, parameters, items, elements, objects, symbols, characters, terms, numbers, or the like. It should be noted, however, that all of these terms and similar terms are to be associated with the appropriate physical quantities and are merely convenient labels applied to these quantities.

The description of the present invention has been presented for purposes of illustration but is not intended to be exhaustive or limited to the disclosed embodiments. Many modifications and variations will be apparent to those of ordinary skill in the art. The embodiments were chosen to explain the principles of the invention and its practical applications and to enable others of ordinary skill in the art to understand the invention in order to implement various embodiments with various modifications as might be suited to other contemplated uses.

The invention claimed is:

1. An apparatus for throttling data transmissions within a data processing system, the apparatus comprising:
   a central processing unit (CPU), a computer readable memory, and a computer readable storage media;
   program instructions to receive, within the application layer of a server, information about a data transfer from a server to a client;
   program instructions to store, within the application layer of a server, information about the data transfer along with information about a number of recent data transfers from the server to the client; and
   program instructions to delay, within the application layer of the server, the data transfer from the application layer of the server for an amount of time that is approximately equal to a computed delay time value in response to a determination that an average data transfer rate over the number of recent data transfers from the server to the client may exceed a data transfer rate threshold parameter; and wherein
   the program instructions to receive, the program instructions to store, and the program instructions to delay are stored on the computer readable storage media for execution by the CPU via the computer readable memory.

2. The apparatus of claim 1 further comprising:
   program instructions to release the data transfer to be performed without delaying the data transfer from the application layer of the server for an amount of time that is approximately equal to a computed delay time value in response to a determination that the average data transfer rate over the number of recent data transfers from the server to the client does not exceed a data transfer rate threshold parameter.

3. The apparatus of claim 1 further comprising:
   program instructions to obtain information about the data transfer that includes a byte count for a number of bytes in the data transfer and an approximate transferal time for the data transfer from the application layer of the server.

4. The apparatus of claim 1 further comprising:
   program instructions to store, within the application layer of a server, information about the data transfer along with information about a number of recent data transfers from the server to a plurality of clients; and
   program instructions to delay, within the application layer of the server, the data transfer from the application layer of the server for an amount of time that is approximately equal to a computed delay time value in response to a determination that an average aggregate data transfer rate over the number of recent data transfers from the server to the plurality of clients may exceed an aggregate data transfer rate threshold parameter.

5. The apparatus of claim 4 further comprising:
   program instructions to release the data transfer to be performed without delaying the data transfer from the application layer of the server for an amount of time that is approximately equal to a computed delay time value in response to a determination that an average aggregate data transfer rate over the number of recent data transfers from the server to the plurality of clients does not exceed an aggregate data transfer rate threshold parameter.

6. The apparatus of claim 4 further comprising:
   program instructions to compute a first delay time value using information about the number of recent data transfers from the server to the client;
   program instructions to compute a second delay time value using information about the number of recent data transfers from the server to the plurality of clients; and
   program instructions to select, as the computed delay time value for delaying the data transfer from the application layer of the server, the first delay time value or the second delay time value based on which delay time value is larger.

7. The apparatus of claim 4 further comprising:
   program instructions to perform additional processing for the data transfer by a specific thread in a multi-threaded process that contains a unique thread for each client in the plurality of clients.

8. The apparatus of claim 1 wherein the program instructions to delay further comprises:
   program instructions to perform a thread sleep for an amount of time that is approximately equal to the computed delay time value.

9. A non-transitory computer readable storage medium encoded with a computer program for use in a data processing system for throttling data transmissions within the data processing system, the computer program comprising:
   program instructions to receive, within the application layer of a server, information about a data transfer from a server to a client;
   program instructions to store, within the application layer of a server, information about the data transfer along with information about a number of recent data transfers from the server to the client; and
   program instructions to delay, within the application layer of the server, the data transfer from the application layer of the server for an amount of time that is approximately equal to a computed delay time value in response to a determination that an average data transfer rate over the number of recent data transfers from the server to the client may exceed a data transfer rate threshold parameter.

10. The non-transitory computer readable storage medium of claim 9 further comprising:
    program instructions to release the data transfer to be performed without delaying the data transfer from the application layer of the server for an amount of time that is approximately equal to the computed delay time value in response to a determination that the average data transfer rate over the number of recent data transfers from the server to the client does not exceed a data transfer rate threshold parameter.

11. The non-transitory computer readable storage medium of claim 9 further comprising:
    program instructions to obtain information about the data transfer that includes a byte count for a number of bytes in the data transfer and an approximate transferal time for the data transfer from the application layer of the server.

12. The non-transitory computer readable storage medium of claim 9 further comprising:
    program instructions to store, within the application layer of a server, information about the data transfer along with information about a number of recent data transfers from the server to a plurality of clients; and
    program instructions to delay, within the application layer of the server, the data transfer from the application layer of the server for an amount of time that is approximately equal to a computed delay time value in response to a determination that an average aggregate data transfer rate over the number of recent data transfers from the server to the plurality of clients may exceed an aggregate data transfer rate threshold parameter.

13. The non-transitory computer readable storage medium of claim 12 further comprising:
    program instructions to release the data transfer to be performed without delaying the data transfer from the application layer of the server for an amount of time that is approximately equal to the computed delay time value in response to a determination that an average aggregate data transfer rate over the number of recent data transfers from the server to the plurality of clients does not exceed an aggregate data transfer rate threshold parameter.

14. The non-transitory computer readable storage medium of claim 12 further comprising:
    program instructions to compute a first delay time value using information about the number of recent data transfers from the server to the client;
    program instructions to compute a second delay time value using information about the number of recent data transfers from the server to the plurality of clients; and
    program instructions to select, as the computed delay time value for delaying the data transfer from the application layer of the server, the first delay time value or the second delay time value based on which delay time value is larger.

15. The non-transitory computer readable storage medium of claim 12 further comprising:
    program instructions to perform additional processing for the data transfer by a specific thread in a multi-threaded process that contains a unique thread for each client in the plurality of clients.

16. The non-transitory computer readable storage medium of claim 9 wherein the program instructions to delay further comprises:
    program instructions to perform a thread sleep for an amount of time that is approximately equal to the computed delay time value.

* * * * *